United States Patent [19]

Hennessy et al.

[11] 4,225,174
[45] Sep. 30, 1980

[54] JAW-TYPE REFUSE COLLECTING DEVICE

[76] Inventors: Michael P. Hennessy, 1924 W. Wilson Ave., Chicago, Ill. 60640; Andrew B. Prueher, 1016 Sheridan Rd., Highland Park, Ill. 60035; Paul E. Wagner, 2471 N. Clybourn Ave., Chicago, Ill. 60614

[21] Appl. No.: 853,811
[22] Filed: Nov. 21, 1977
[51] Int. Cl.² ............................................. A47F 13/06
[52] U.S. Cl. .................................................... 294/113
[58] Field of Search ................. 294/14 R, 19 A, 1 R, 294/55, 50.5, 50.6, 50.7, 50.8, 100, 115, 116, 113 A; 119/1 R; 15/257.41, 257.3, 257.6, 257.7

[56] References Cited
U.S. PATENT DOCUMENTS

| 3,139,299 | 6/1964 | Bowen | 294/55 |
| 3,446,525 | 5/1969 | Jones | 294/19 R |
| 3,733,098 | 5/1973 | Tobias | 294/19 R |
| 3,841,686 | 10/1974 | Gallo et al. | 294/19 R |

Primary Examiner—James B. Marbert
Attorney, Agent, or Firm—James J. Conlon

[57] ABSTRACT

A sanitary refuse device for collecting waste products such, for example, as the droppings of dogs, cats, and other animals. A hollow, cane-like, substantially vertical handle has a pistol-type grip at its upper end and a pair of normally open, spring-biased, pick-up jaws at its lower end, one of the jaws being fixedly connected to the lower end of the handle and the other jaw being pivotally mounted so as to swing to and from the fixed jaw. A trigger in associated relation with the piston-type grip is connected to the pivoted jaw through the medium of an actuating rod which passes through the handle and normally exists under compression in order to maintain the pivoted jaw in its open position against the action of the associated spring. Retraction of the trigger places the actuating rod under tension so that it becomes a pull rod and causes the pivoted jaw to swing towards the fixed jaw into a closed position. A latch arrangement is associated with the trigger and maintains the latter in its retracted position until released.

6 Claims, 6 Drawing Figures

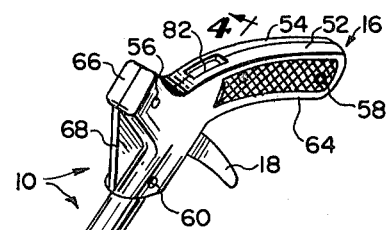
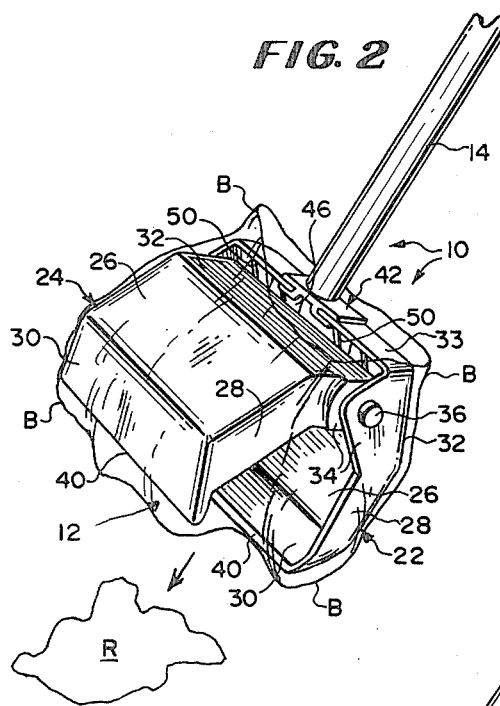
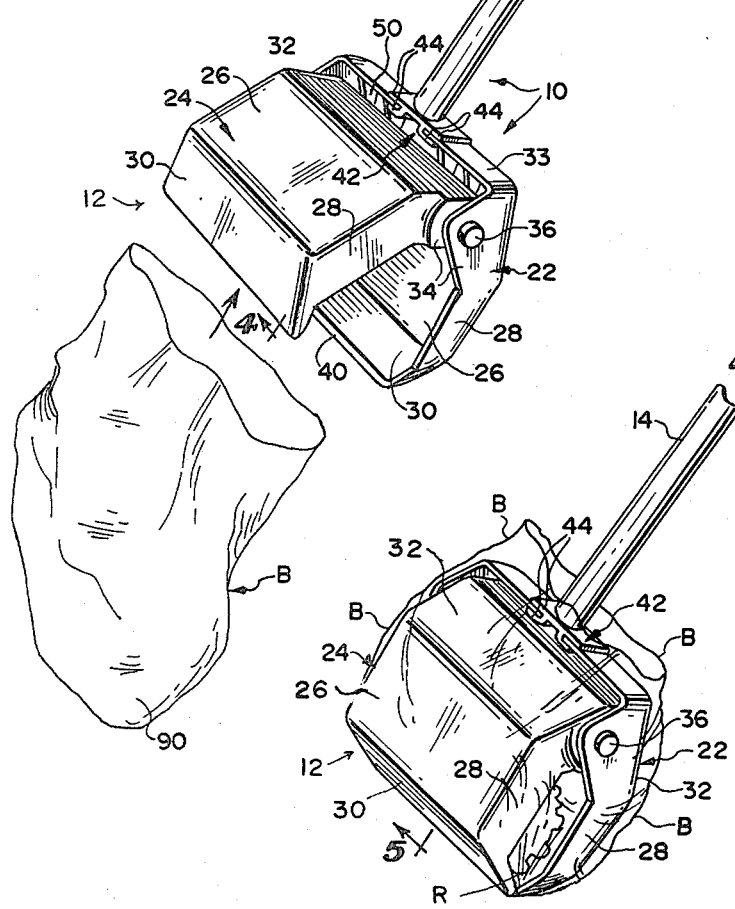
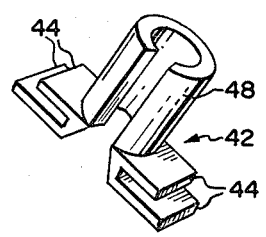

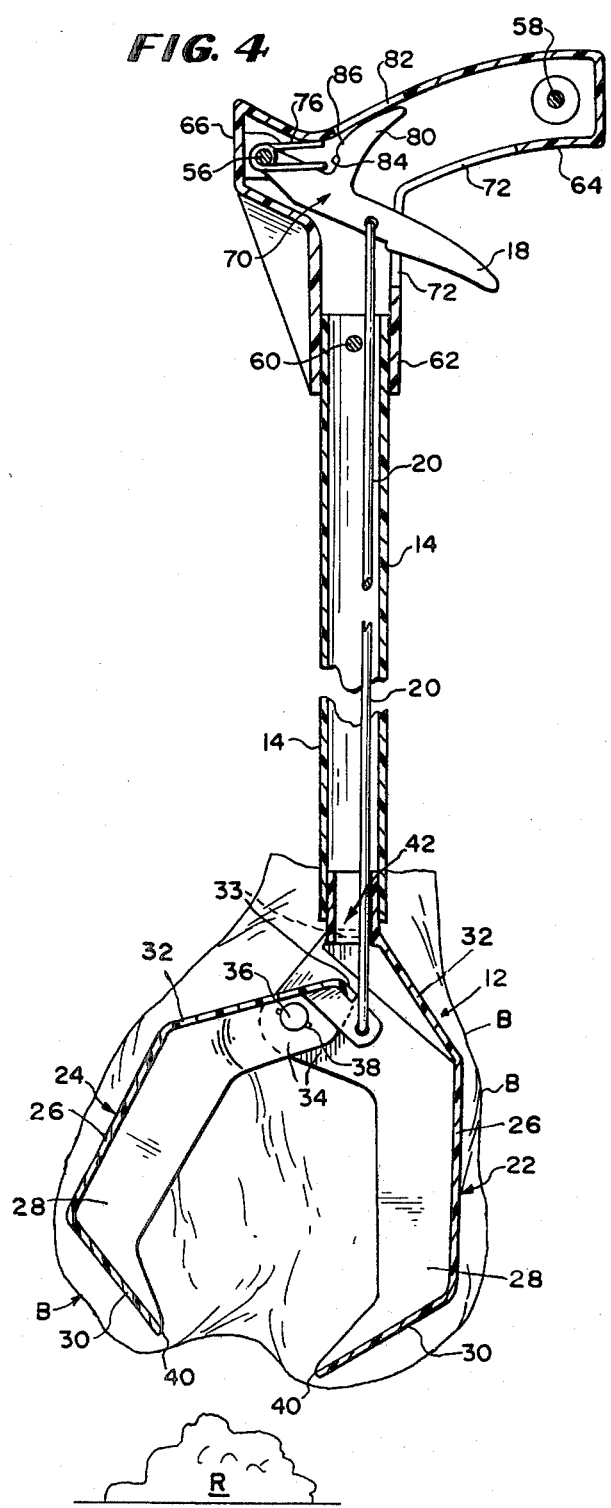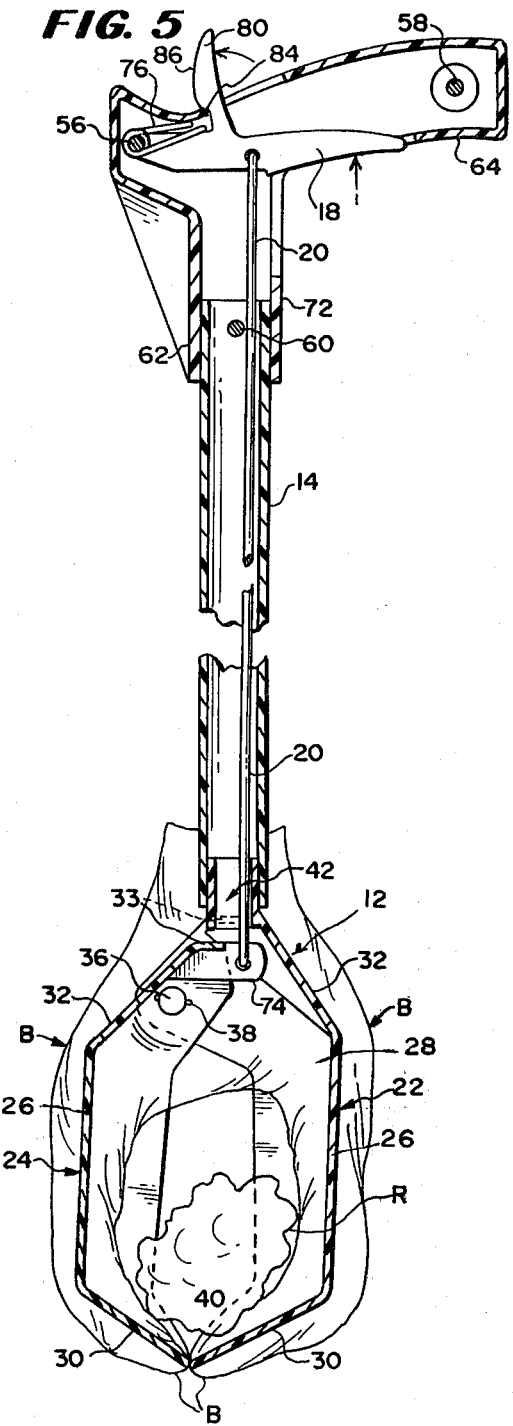

JAW-TYPE REFUSE COLLECTING DEVICE

| PERTINENT PRIOR ART | | | |
|---|---|---|---|
| Veech | 3,912,316 | October 14, 1975 | 294/19 R |
| Tobias | 3,733,098 | May 15, 1973 | 294/19 R |
| OTHER ART OF INTEREST | | | |
| Drum | 3,757,737 | September 11, 1973 | 119/1 |
| Gallo et al | 3,841,686 | October 15, 1974 | 294/19 R |
| Magliaro | 3,868,135 | February 25, 1975 | 294/1 R |
| Krogstad et al | 3,986,744 | October 19, 1976 | 294/55 |
| Baughman | 3,937,512 | February 10, 1976 | 294/19 R |
| Cabaluna | 3,977,422 | August 31, 1976 | 135/66 |
| Fano | 4,003,595 | January 18, 1977 | 294/19 R |
| D'Ath | 4,032,182 | June 28, 1977 | 294/19 R |

The present invention relates generally to refuse collecting devices and has particular reference to a device for the removal and disposal of animal droppings or excreted solid materials, particularly those of dogs and cats in such places as gardens and lawns and on or along sidewalks and other public places as well as indoors.

Currently there is much adverse criticism of dog owners for permitting their animals to deposit their droppings in public places and on the property of other persons. In some geographical locations, legislation has recently been enacted requiring a dog owner not only to clean up after his or her pet in any public area, but also actually to carry an approved device for performing the pick-up task.

To combat this problem, many different types of refuse collecting devices have been devised other than the usual dust pans, brooms, or trowels which have long been used for clean-up purposes. The most satisfactory of these devices are such that they may be operated with one hand and without necessitating bending over or stooping to the end that the accompanying leashed animal may be securely held with the other hand. In general, such devices are of two distinctive types, the first type including a device having cooperating jaws at the lower end of a relatively long cane-like handle, together with a hand or foot-operated piece by means of which the jaws may be actuated. The other type includes a scoop arrangement which is forcibly slid beneath a given dropping and some of these devices have associated therewith a paddle-like closure which is movable in a reverse direction toward the edge of the scoop in order to pull the excrement or refuse into the scoop if the dislodged material does not overlie the scoop at the time an attempt is made to pick it up. With both of these types, some of the devices make provision for collecting the refuse material in an open refuse bag, the refuse material entering the open end of the bag in the usual manner of a bag-filling operation, thus soiling the open rim region of the bag where it subsequently is tied as a preliminary to disposal of the bag and its contents.

The refuse collecting device of the present invention combines the features of both types of previously designed devices as outlined above and, moreover, it embodies or incorporates the use of a refuse collecting bag which is disposable after it has been filled. Accordingly, the invention contemplates the provision of two relatively movable, complemental, coacting, pick-up jaws which are carried at the lower end of an elongated, substantially vertical, cane-like handle, one of the jaws being fixedly mounted on the handle and the other jaw being movable towards and away from the fixed jaw. The fixed jaw is designed so that it may be used in scoop-like fashion for picking up excrement, while the movable jaw may be used as a reverse paddle, as heretofore outlined, to force excrement into the scoop-like jaw. Alternatively, by holding the cane-like handle in the normal or operative, substantially vertical position, the usual pincers-like action of the two jaws may be used for excrement pick-up purposes.

A refuse collecting device of this general nature which utilizes a pair of pick-up jaws at the lower end of a cane-like handle is shown and described in U.S. Pat. No. 3,912,316, granted on Oct. 14, 1975, and entitled "LITTER COLLECTOR." The structure of such patent is, however, possessed of certain limitations, one of which resides in the fact that the open and "bagged" jaws of the device must be aimed, so to speak, or pointed directly downwardly at the excrement which is to be picked up and then lowered over such excrement, after which the foot of the user is employed to trip a latch mechanism which releases a spring mechanism which normally biases the jaws to their closed position, the latch mechanism ordinarily holding the jaws open. If the area of the excrement is larger than the span of the open jaws, not all of it is picked up and the operation must be repeated. However, any attempt to repeat the operation will necessitate opening the jaws with the picked up excrement inside so that when the jaws are again pointed downwardly, such excrement will fall out on top of the new area of excrement that is to be removed. This necessitates piling of excrement wads upon other excrement wads or, alternatively, disposing of a bag for each increment of excrement that is undergoing removal. The use of a foot action each time to allow the jaws to move to their closed position is awkward and is likely to misalign the aforementioned aiming action that is necessary each time the device is used. Most importantly, the jaws are provided with handles which must be grasped for jaw-opening purposes and this requires either stooping over each time the jaws are opened or turning the device upside down which is a time-consuming operation.

The present invention is designed as an improvement over the litter collector of aforementioned U.S. Pat. No. 3,912,316 and it differs structurally from such litter collector in that the jaws thereof are in effect spring-biased toward their open position and a pistol grip-type device which is carried at the upper end of the cane-like handle for the jaws embodies a trigger which operates through the medium of an actuating rod to shift the jaws to their closed position when the trigger is squeezed or retracted. The trigger has associated therewith latch means so that when the jaws become fully closed, they become latched in their closed position. By such an arrangement, no stooping is necessary at any time during the operation of the device. Moreover, it is not necessary to aim the jaws toward the excrement or refuse which is to be picked up and removed since one of the two jaws may be used as a scoop when the handle is appropriately inclined to underlie a large area of excrement before the trigger is depressed to release the open jaws and allow them to move to their closed position. Several passes may be made at the same area of excrement to insure its entire inclusion within the bag-enveloped jaws before the trigger is depressed and, once it is thus depressed, the entire mass of excrement will be contained within the jaws. When moving from one mass of excrement to another, the latch means may be maintained effective to hold the jaws closed so that there will be no danger of loss of excrement from between the jaws, and at the time a second of fresh area of increment is reached, a thumb action on the trigger latch will serve to reopen the jaws, such release taking place after the handle has been properly tilted for performance of the next scooping operation. The construction of a refuse collecting device such as has briefly been outlined above and possessing the stated advantages constitutes the principal object of the present invention.

The provision of a refuse collecting device which is extremely simple in its construction and, therefore, may be manufactured at a low cost; one which may be manufactured substantially entirely from plastic material by simple molding operations, thereby further contributing to low cost; one which is possessed of a minimum number of parts, particularly moving parts, and, therefore, is unlikely to get out of order; and one which is attractive in its appearance and pleasing in its design, are further desirable features which have been borne in mind in the production and development of the present invention.

Numerous other objects and advantages of the invention not at this time set forth will be apparent from a consideration of the following detailed description.

The invention consists in the several novel features which are hereinafter set forth and are more particularly defined by the claims at the conclusion hereof.

In the accompanying two sheets of drawings forming a part of this specification, one illustrative embodiment of the invention is shown.

In these drawings:

FIG. 1 is a top perspective view of a jaw-type refuse collecting device embodying the principles of the present invention, the relatively movable jaws of the device being shown in their open position and illustrating schematically the manner in which a disposable flexible bag may be applied thereto;

FIG. 2 is a fragmentary perspective view of the jaw portion of the device, the disposable bag being shown as operatively applied to the open jaws preparatory to picking up refuse;

FIG. 3 is a perspective view similar to FIG. 1 but showing the jaws in their closed and latched position with the disposable bag in its refuse-retaining position;

FIG. 3a is an enlarged detail perspective view of an attachment piece which is employed in connection with the invention and serves fixedly to secure one of the two complemental jaws to the cane-like handle;

FIG. 4 is an enlarged, fragmentary, sectional view taken centrally and longitudinally through the device, the view being taken substantially on the line 4—4 of FIG. 1 and showing the disposable bag in position over the jaws; and FIG. 5 is an enlarged, fragmentary, sectional view taken on the line 5—5 of FIG. 3.

Referring now to the drawings in detail, and in particular to FIGS. 1 and 4, briefly, the refuse collecting device of the present invention is designated in its entirety by the reference numeral 10, and it involves in its general organization a pair of articulated refuse pick-up jaws 12, a hollow or tubular, cane-like handle 14, and a combined jaw-actuating and locking, pistol grip assembly 16. Such parts are preferably made of molded plastic material. The pair of pick-up jaws 12 is carried at the lower end of the handle 14, while the pistol grip assembly 16 is carried at the upper end of the handle. As will be described presently in greater detail, the jaws 12 are normally maintained in their open position, but they are adapted to be shifted to their closed position and releasably latched in such position by means of a spring-biased trigger 18 and an associated actuating or pull rod 20, the former being associated with the pistol grip assembly 16 and the latter projecting through the handle 12.

Although the refuse collecting device 10 as briefly described above is capable of use in picking up a wide variety of refuse such as unwanted stones or rocks, fallen fruit, leaves, small twigs, tin cans, and other such objects of a generally solid non-objectionable, non-adhering and non-soiling nature, it has been designed primarily for picking up animal droppings or excrement such as may be left on a sidewalk or lawn, and when so used, it is designed to have associated therewith a disposable, excrement-collecting bag B such as appears in all of the principal views of the drawings and the nature of which, in its free or normal state, is disclosed in FIG. 1 of the drawings.

Considering the refuse collecting device 10 per se, and exclusive of the disposable bag B, and still referring to FIGS. 1 and 4, the pair of jaws 10 consists of what will hereinafter be referred to as a fixed jaw 22 and a pivotally mounted jaw 24. The two jaws are of similar design and each is of dished-shaped configuration and comprises a flat, generally rectangular, main wall 26, a pair of opposed, spaced apart, cut-away, parallel side walls 28, a slanting or angularly disposed bottom wall 30, and a slanting top wall 32. The top wall 32 of the fixed jaw 22 is formed with a narrow, laterally extending flange 33 which is disposed at right angles to the main wall 26 of said fixed jaw. The upper regions of the cut-away side walls 28 present pairs of overlapping ears 34, and these are pivoted together by headed pivot studs 36 which are held in place by transversely extending pins 38. The dished arrangement of the two jaws 22 and 24 is such that when the jaws are in the closed position in which they are shown in FIGS. 3 and 5, the bottom walls 30 present meeting linearly straight edges 40. Because of the fact that the side walls 28 are cut away as previously described, the side walls 28 of the jaws 22 and 24 do not meet as shown in FIGS. 3 and 5.

As best illustrated in FIGS. 4 and 5 of the drawings, the handle 14 is of elongated, open-ended, tubular construction and the lower end thereof is fixedly secured to the fixed jaw 22 by means of a unitary attachment piece 42 (see FIG. 3a). Such piece is formed of molded plastic material and embodies pairs of oppositely facing, vertically spaced flanges 44 (see FIGS. 1 and 3) which straddle the portions of the top wall flange 33 of the fixed jaw 22 which define the sides of a notch 46 in said flange 33. The attachment piece 42 also embodies a tubular upstanding split collar 48 which is press-fitted, heat-sealed, glued, or otherwise fixedly secured within the lower end portion of the handle 14. As previously indicated, all of the principal component parts of the refuse collecting device 10 are preferably formed of molded plastic material and, therefore, the flanges 44 of the attachment piece 42 may be heat-sealed if desired in position over the side edges of the slot 46 so that the piece 42 thus effectively becomes a permanent element or part of the fixed jaw 22. Gusset-like, triangular, reinforcing webs 50 extend between the slanting top wall 32 and the laterally extending flange 33 of the fixed jaw 22 and serve to stabilize or stiffen the upper region of said fixed jaw.

Considering now the jaw-actuating and locking, pistol grip assembly 16, and referring particularly to FIG.

4 of the drawings, such assembly is comprised of two mating or complemental parts 52 and 54 which are releasably secured together by a set of three transversely extending screws 56, 58 and 60, such parts, when assembled, defining a generally L-shaped structure including a substantially vertical sheath 62, a generally horizontal grip proper 64, and a forwardly extending, intermediate offset 66. A reinforcing, gusset-like, triangular web 68 extends between the sheath 62 and offset 66. The aforementioned trigger 18 of the assembly 16 constitutes a combined trigger and latch member and is in the form of an elongated arm 70 which has one end thereof pivoted on the screw 56 and extends outwardly through an elongated slot 72 in the underneath side of the grip proper 64 and the rear portion of the sheath 62. The projecting or distal end portion of the arm 70 establishes a trigger proper. The aforementioned pull rod 20 is preferably formed of heavy wire stock and has its upper end pivotally connected to a medial region of the trigger arm 70 and the lower end thereof bent at right angles and pivotally connected to the distal end of a crank arm 74 (see FIGS. 4 and 5) which is provided on the top wall 32 of the movable jaw 24 and is disposed within the confines of said movable jaw. A hairpin-like spring 76 (see FIGS. 4 and 5) yieldingly biases the triger arm 70 downwardly and, since the pull rod 20 is possessed of a considerable degree of rigidity, the torque which normally is applied to the crank arm 74 serves to maintain the movable jaw 24 in its open position relatively to the fixed jaw 22, with the pull rod 20 normally being maintained under compression. At such time as it is desired to close the movable jaw 24 upon the fixed jaw 22, upward movement of the trigger 18 will swing the arm 70 upwardly and thus place the pull rod 70 under tension so as to raise the crank arm 74 and bring the movable jaw 24 to its closed position as shown in FIG. 5. The central portion of the hairpin-like spring 76 is in the form of a loop and extends around the central portion of the screw 56. The legs of the spring are normally disposed in substantially parallel relation and undergo compression when forced together as a result of retraction of the trigger arm 70. As best shown in FIGS. 4 and 5, the upper leg abuts against the top wall of the forwardly extending intermediate offset 66 and the lower leg has its distal or outer end bent at right angles and arranged so that it is in abutment with the central portion of the upper side edge of the trigger arm.

As best shown in FIGS. 4 and 5 of the drawings, the pivoted trigger arm 70 has formed on its central portion an integral, upstanding, latch finger 80 which, when the arm 70 is in its normal spring-biased lower position as shown in FIG. 4, lies wholly within the confines of the pistol grip assembly 16. At such time as the trigger 18 is "squeezed" in the usual manner of pistol grip devices, the latch finger 80 is projected outwardly through a slot 82 in the top wall of the grip proper 64 and a notch-formed latch shoulder 84 on the finger 80 snaps over the front end edge of the slot 82 and maintains the trigger arm 70 in its raised position so that the jaws 22 and 24 are maintained in their closed position.

It is to be noted at this point that, with the exception of the pull rod 20 and the fastening screws 56, 58 and 60, since all of the components of the herein described refuse collecting device 10 are comprised of plastic material, the latch finger 80 is slightly flexible. The forward surface of the finger is curved or arcuated as indicated at 86 and, in effect, constitutes a cam surface which yields slightly to allow the latch finger 80 to slide on the forward edge of the slot 82 in order to allow the latch shoulder 84 to move to its latching position as previously indicated. When it is desired to release the latch finger 80 from the slot 82, it is only necessary for the operator to exert a rearward force on the finger, utilizing his or her thumb for this purpose. As soon as the shoulder 84 clears the edge of the slot 82, the spring 76 will force the trigger arm 70 downwardly and cause opening of the jaws 22 and 24 as previously described.

As heretofore mentioned, the refuse collecting device 10 is usable for picking up a wide variety of litter without necessitating the use of the disposable bag B. However, where dog or other animal excrement is concerned, or whether semi-solid garbage matter which has been spilled outdoors is to be collected, the use of the bag B is highly desirable. As shown in FIG. 1 of the drawings, the bag B has its upper end open and its lower end closed. Preferably, the bag is formed of transparent or opaque polyethylene or like readily flexible plastic material and has a thickness on the order of two mils. In the operation of the device 10, the open upper end of the bag is spread over the wide open jaws 22 and 24 until the entire jaw portion of the device is disposed wholly within the bag B. With the jaws 22 and 24 remaining in their open position, the bottom region or base portion 90 of the bag (see FIG. 1) is tucked or folded inwardly between the jaws as shown in FIG. 2. Alternatively, the bottom portion of the bag B may be initially inserted between the two jaws 22 and 24 and the rim region of the bag may then be folded or cuffed in a reverse fashion around the jaws. In either event, a portion of the bag B will be cuffed upon itself with the jaws projecting between the cuffed portion and the inverted bottom region of the bag.

When picking up a quantity of excrement or refuse such as is designated at R in FIG. 2, the handle 14 will be held at an angle on the order of 45° so that the main wall 30 of the fixed jaw 22 will extend substantially horizontally and, thereafter, the bag-covered main wall 30 of said fixed jaw may be used as a scoop for sliding motion beneath the refuse. The refuse will, of course, enter the reversed or inverted bottom portion of the bag B, and when it has thus been completely scooped or when at least a major portion of the refuse has been scooped, the operator will raise the trigger 18 by exerting a squeezing action on the grip proper of the pistol grip assembly 16, thereby placing the pull rod 20 (see FIGS. 4 and 5) under tension as previously described and causing the movable jaw 24 to swing to its closed position relatively to the fixed jaw 22 as shown in FIGS. 3 and 5. During such swinging movement, any refuse that has not been completely scooped into the jaws by the forward sliding movement of the device will be forced into the confines of the jaws by the rearwardly swinging movable jaw 24. At the time that the trigger 18 reaches its fully retracted or raised position, the latch shoulder 84 on the latch finger 80 will maintain the trigger retracted and the pull rod under tension so that the jaws 22 and 24 will remain in their fully closed position with the opposed jaw edges 40 pinching off the excrement, so to speak, so that it remains substantially within the reversed or inverted portion of the bag B. Finally, with the jaws 22 and 24 remaining in their latched closed position, the cuffed portion of the bag B may be "peeled" downwardly and removed from the jaws, after which a conventional twist wire which ordinarily is supplied when purchasing disposable bags may be applied to the peeled portion of the bag and the jaws 22 and 24 may then be opened by utilizing thumb pressure on the latch 80 as previously described. The bag and its contents may then be removed from between the jaws and disposed of in any suitable manner. It is to be noted at this point that the inside of the bag B which ordinarily is intended to be the inner side has now become the outside of the bag.

From the above description, it will be apparent that an extremely sanitary method of picking up refuse, particularly animal refuse, has been provided and that numerous advantages accrue therefrom. Among these advantages is the fact that no contact whatsoever of the hands of the user or operator with the refuse is resorted to. Furthermore, only one hand is required for the operation of the device so that the other hand is left free to hold an animal firmly on its leash if the animal is being walked. Still further, no stooping or bending of the user's body is necessary when using the device. Finally, after the excrement or refuse-filled bag is disposed of, the device 10 remains substantially clean and does not require washing, rinsing, or the like. It may simply be put on the shelf or otherwise stored for future use by the application thereto of a fresh disposable bag B.

The invention is not to be limited to the exact arrangement of parts shown in the accompanying drawings or described in this specification as various changes in the details thereof may, if desired, be resorted to without departing from the spirit or scope of the invention. For example, it is within the purview of the invention to omit the attachment piece 42 altogether and, instead, construct the upstanding collar 48 of FIGS. 3a, 4, and 5 as an integral part of the top wall flange 33 of the fixed jaw 22. Therefore, only insofar as the invention is particularly pointed out in the accompanying claims is the same to be limited.

Having thus described the invention what we claim as new and desire to secure by Letters Patent is:

1. A refuse collecting device adapted during use thereof to extend substantially vertically and comprising an upstanding tubular handle; a pair of opposed jaws located at the lower end of the handle and consisting of a fixed jaw connected rigidly to the lower end of the handle and a movable jaw pivoted to the fixed jaw for swinging movement towards and away from said fixed jaw between closed and open positions, and provided on its upper portion with a fixed crank arm; a hollow pistol grip assembly located at the upper end of the handle and embodying a substantially L-shaped casing consisting of a generally horizontal grip proper and a generally vertical sheath connected to and depending from one end of the grip proper and telescopically received over the upper end of the handle, an elongated trigger arm having one end thereof disposed within the casing, its intermediate portion extending through a slot in the underneath side of the grip proper and also in the sheath in the casing, and its other end exposed and disposed adjacent to said underneath side of the grip proper, and a pivot element disposed within said casing and applied to said one end of the trigger arm so that said trigger arm is pivoted to move up and down between retracted and unretracted positions; a pull rod extending loosely and longitudinally through the handle, having its upper end pivotally connected to the trigger arm between the latter's one end and intermediate portion and its lower end pivotally connected to the distal end of the crank arm on the upper portion of the movable jaw, and adapted when the trigger arm is swung upwards to its retracted position to move the movable jaw into its closed position and when the trigger arm is swung downwards to its unretracted position to swing the movable jaw to its open position; and spring means disposed within the casing and applied to the trigger arm in such manner that it yieldingly biases the latter to its unretracted position.

2. A refuse collecting device as set forth in claim 1 and wherein the spring means is of hairpin-like construction and comprises a central loop which surrounds the pivot element, and a pair of relatively movable legs one of which has one of its ends connected to one end of the loop and its other end in abutment with a wall of the casing and the other of which has one of its ends connected to the other end of the loop and its other end in abutment with the trigger arm.

3. A refuse collecting device as set forth in claim 1 and wherein the casing of the hollow pistol grip assembly is in the form of two complemental or mating parts which are connected together by transversely extending screws, and one of the screws extends through a hole in the inner end of the trigger arm and constitutes the pivot element for said trigger arm.

4. A refuse collecting device as set forth in claim 3 and wherein the spring means is of hairpin-like construction and comprises a central loop which surrounds the one screw and a pair of relatively movable legs one of which has one of its ends connected to one end of the loop and its other end in abutment with a wall of the casing and the other of which has one of its ends connected to the other end of the loop and its other end in abutment with the trigger arm.

5. A refuse collecting device as set forth in claim 1 and comprising, additionally, a latch which serves releasably to hold the trigger arm in its retracted position and comprises a rigid upstanding latch finger which is formed on the central portion of the trigger arm, extends upwards through a slot in the upper side of the grip proper when the trigger arm is in its retracted position and has a shoulder which makes latching engagement with one end of said slot in the upper side of the grip proper.

6. A refuse collecting device as set forth in claim 1 and wherein the fixed jaw has on its upper portion an inwardly extending flange the central portion of which is disposed beneath the lower end of the tubular handle and has a notch in it, and said fixed jaw is connected rigidly to the lower end of the handle by way of a unitary attachment piece which comprises a substantially vertical collar which is telescopically received over the lower end of the handle, and, in addition, pairs of oppositely facing vertically spaced flanges which are connected to and project outwardly from the lower end of the collar and straddle the portions of the top wall flange of the fixed jaw which define the sides of said notch.

* * * * *